US010067893B2

United States Patent
Egi et al.

(10) Patent No.: US 10,067,893 B2
(45) Date of Patent: Sep. 4, 2018

(54) ACCELERATION FRAMEWORK WITH DIRECT DATA TRANSFER MECHANISM

(71) Applicant: Futurewei Technologies, Inc., Plano, TX (US)

(72) Inventors: Norbert Egi, Santa Clara, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 248 days.

(21) Appl. No.: 14/678,528

(22) Filed: Apr. 3, 2015

(65) Prior Publication Data

US 2016/0292101 A1    Oct. 6, 2016

(51) Int. Cl.
    *G06F 13/28*    (2006.01)
    *G06F 13/42*    (2006.01)

(52) U.S. Cl.
    CPC .......... *G06F 13/28* (2013.01); *G06F 13/4282* (2013.01)

(58) Field of Classification Search
    CPC ....................................................... G06F 13/28
    See application file for complete search history.

(56) References Cited

U.S. PATENT DOCUMENTS

| 2013/0238582 A1* | 9/2013 | Li .................... G06F 17/30115 |
| | | 707/705 |
| 2014/0053131 A1 | 2/2014 | Ravi et al. |
| 2015/0220354 A1* | 8/2015 | Nair ....................... G06F 13/28 |
| | | 710/301 |

FOREIGN PATENT DOCUMENTS

| CN | 1808319 A | 7/2006 |
| CN | 101986305 A | 3/2011 |
| CN | 102497550 A | 6/2012 |

OTHER PUBLICATIONS

"International Application Serial No. PCT/CN2016/075874, International Search Report dated May 27, 2016", 5 pgs.
"International Application Serial No. PCT/CN2016/075874, Written Opinion dated May 27, 2016", 4 pgs.

* cited by examiner

*Primary Examiner* — Zachary K Huson
(74) *Attorney, Agent, or Firm* — Futurewei Technologies, Inc.

(57) ABSTRACT

Systems and methods for offloading computations from a CPU directly to an accelerator engine are disclosed. One embodiment includes determining a function of an application to be offloaded from a CPU to an accelerator engine, locating data within a file necessary to perform the functions, programming a logic of the accelerator engine based on the function to be offloaded, programming a DMA engine to move a copy the data from a secondary storage device to the accelerator engine, and processing the data at the accelerator engine using the programmed logic.

27 Claims, 4 Drawing Sheets

ACCELERATION FRAMEWORK WITH DIRECT DATA TRANSFER MECHANISM

FIELD

Embodiments of the present invention generally relate to the field of hardware-based acceleration. More specifically, embodiments of the present invention relate to offloading computations to a hardware-based accelerator.

BACKGROUND

Hardware based acceleration systems are used for offloading all or part of an application's processing requirements from the CPU to some other device, such as a field-programmable gate array (FPGA), graphics processing unit (GPU), or digital signal processor (DSP). These special "acceleration devices" have some common characteristics, such as a high number of cores, fast memory, and high degree of parallelization that enables particular workloads to be executed on them at a much higher speed than on general-purposes CPUs. However, these devices have no standalone Operating Systems ("OS") and hence are under the control of the OS running on the CPU that controls the input/output ("I/O") subsystems, including accelerator devices, file systems, and memory transfers.

As commonly implemented, the accelerator devices receive data to be processed from the CPU or memory, typically via a direct memory access ("DMA") operation. After the data has been processed it is returned to the CPU or its memory. This method of offloading data processing is relatively efficient when the size of the data is small (e.g., less than 1 GB) and/or already resides in the memory of the CPU. However, data is often stored on secondary storage devices, such as hard disks or SSDs. This is especially true when the size of the data to be processed by the accelerator is relatively large. In this case, it may be very inefficient to transfer large amounts of data to the CPU's memory before sending the data to the accelerator device.

SUMMARY

The present invention provides a framework for a hardware based acceleration system for offloading parts or all of an application's processing from a general purpose CPU to an accelerator, such as an FPGA, GPU, or DSP, where data is transferred directly from a secondary storage devices to the accelerator.

In one embodiment, an apparatus for offloading execution of a function from a CPU to an accelerator engine is disclosed, including a CPU configured to interact with an application program to determine the function for offloading and locate data on a secondary storage device related to the function, and an accelerator engine coupled to the CPU having a first direct memory access engine, where the accelerator engine is programmed by the CPU to execute the function, and where the CPU is further configured to program the first direct memory access engine to transfer data related to the function from the secondary storage device directly to the accelerator engine.

In another embodiment, a method of offloading computations from a CPU to an accelerator engine is disclosed, including determining a function of an application to be offloaded from a CPU to an accelerator engine, locating data within a file, where the data is related to the function, programming a DMA engine to move a copy of the data from a secondary storage device directly to the accelerator engine, and processing the data by the accelerator engine.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Figure 4:
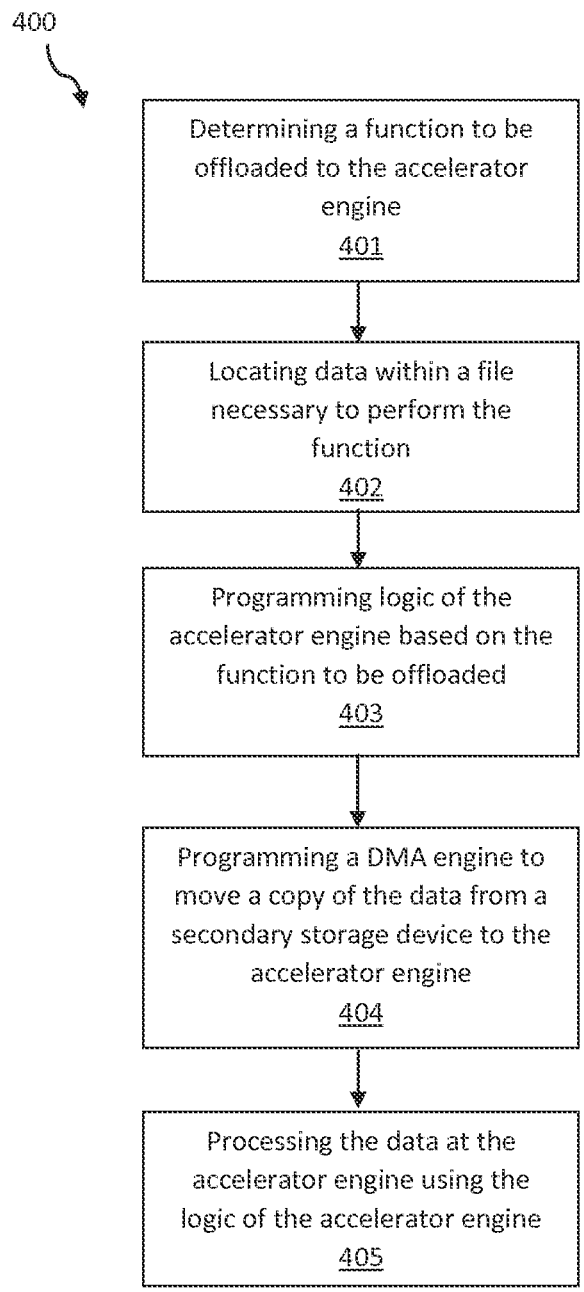
FIG. 4 is a diagram illustrating an exemplary sequence of computer implemented steps for offloading a function for execution from a CPU to an accelerator engine according to embodiments of the present invention.

Portions of the detailed description that follows are presented and discussed in terms of a method. Although steps and sequencing thereof may be disclosed in a figure herein describing the operations of this method (such as FIG. 4), such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system 120, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Acceleration Framework with Direct Data Transfer Mechanism

The present disclosure provides a framework for a hardware based acceleration system capable of offloading all or part of an application's processing from a CPU to an accelerator engine, such as an FPGA, GPU, or DSP, where data is transferred directly from a secondary storage devices to the accelerator engine. The framework described herein provides efficient data movement and coordination for application acceleration used by any type of application for any type of acceleration. This invention relates primarily to moving data between a secondary storage device, an accelerator engine, and a processor efficiently. Application acceleration is often applied in the areas of data analytics and network packet processing.

In the following embodiments, systems and methods for offloading computations from a CPU directly to an accelerator engine are disclosed. One embodiment includes determining a function of an application to be offloaded from a CPU to an accelerator engine, locating data within a file necessary to perform the functions, programming a logic of the accelerator engine based on the function to be offloaded, programming a DMA engine to move a copy the data from a secondary storage device to the accelerator engine, and processing the data at the accelerator engine using the programmed logic.

In another embodiment, a system for offloading computations from a CPU directly to an accelerator engine is described. The system includes a CPU having a controller, where the controllers communicates with an application having a function to be executed to locate and transfer data related to the function to an accelerator engine, a secondary storage device for storing data, and an accelerator engine for executing functions offloaded from the CPU, where the data related to the function is transferred from the secondary storage device to the accelerator engine using direct memory access.

Figure 1:
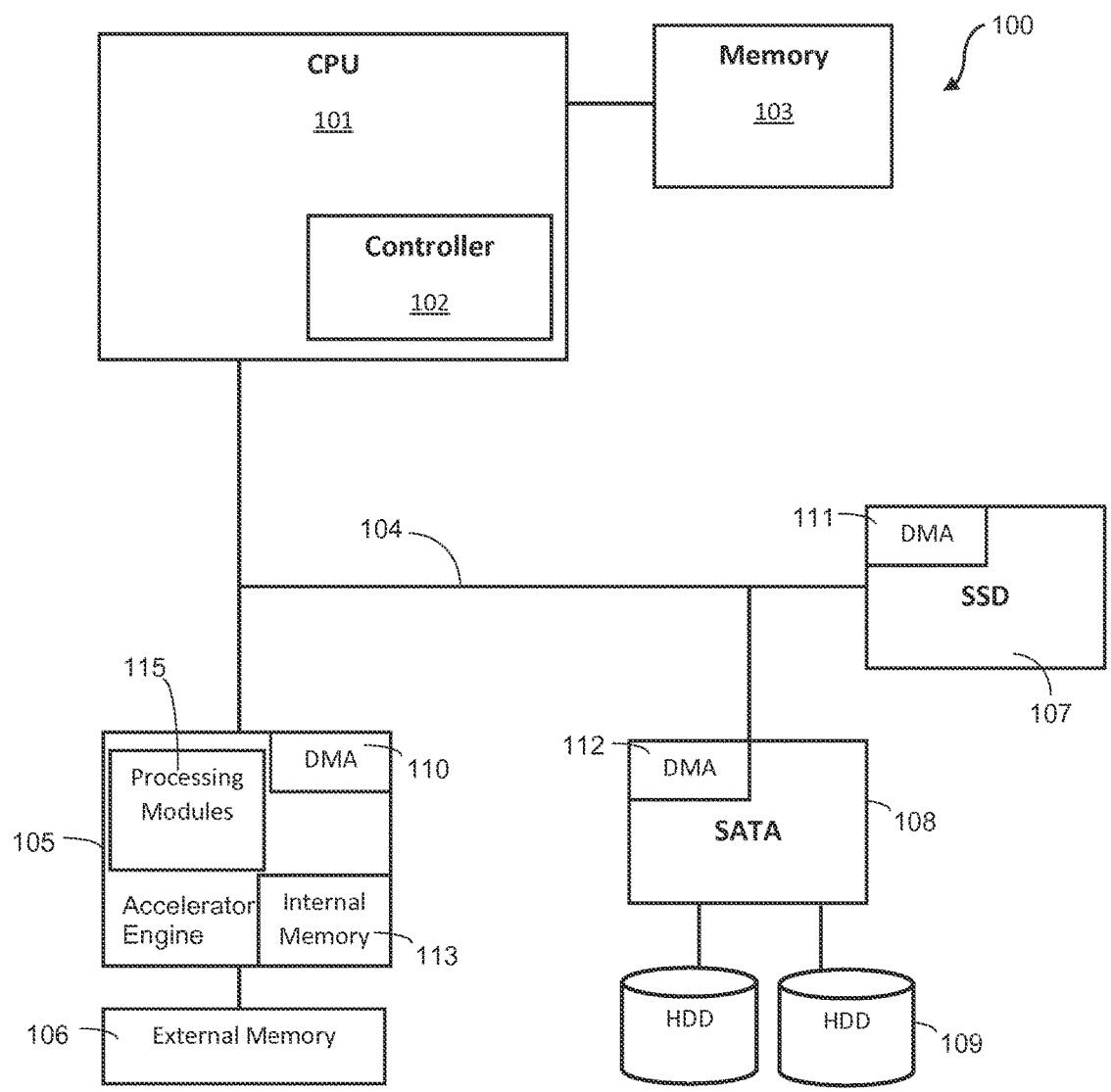
FIG. 1 is a block diagram illustrating an exemplary computer system for offloading a function for execution from a CPU to an accelerator engine according to embodiments of the present invention.

With reference now to FIG. 1, an exemplary system 100 for offloading application processing to an accelerator engine for acceleration is depicted in accordance with embodiments of the present invention. CPU 101 executes an Operating System ("OS") having a kernel, and a file system ("FS"). CPU 101 is electrically coupled to memory 103. Controller 102 orchestrates data movement between a secondary storage device and an accelerator over PCI/Ethernet connection 104. According to some embodiments, Controller 102 is a loadable kernel module that may be loaded into a kernel of the OS. In still other embodiments, a kernel of the OS comprises Controller 102 such that Controller 102 does not need to be loaded into the kernel.

Controller 102 interacts with one or more applications and a kernel through preexisting or newly created interfaces to acquire information in order to locate data and complete the data transfer. Controller 102 interacts with one or more applications in order to identify the function or functions to be offloaded and the files that hold the data needed to perform those functions. Controller 102 communicates with the kernel to retrieve relevant information about the files. Information retrieved by Controller 102 may include inode number, file status, or location on disk, for example. Controller 102 may also interact with the kernel and/or a device driver for programming one or more DMA engines of Storage Controller 108 and Accelerator Engine 105. For example, Controller 102 may obtain an addresses of a DMA and/or an interrupt. An interrupt may be a Message Signaled Interrupt ("MSI") or MSI-X.

Figure 2:
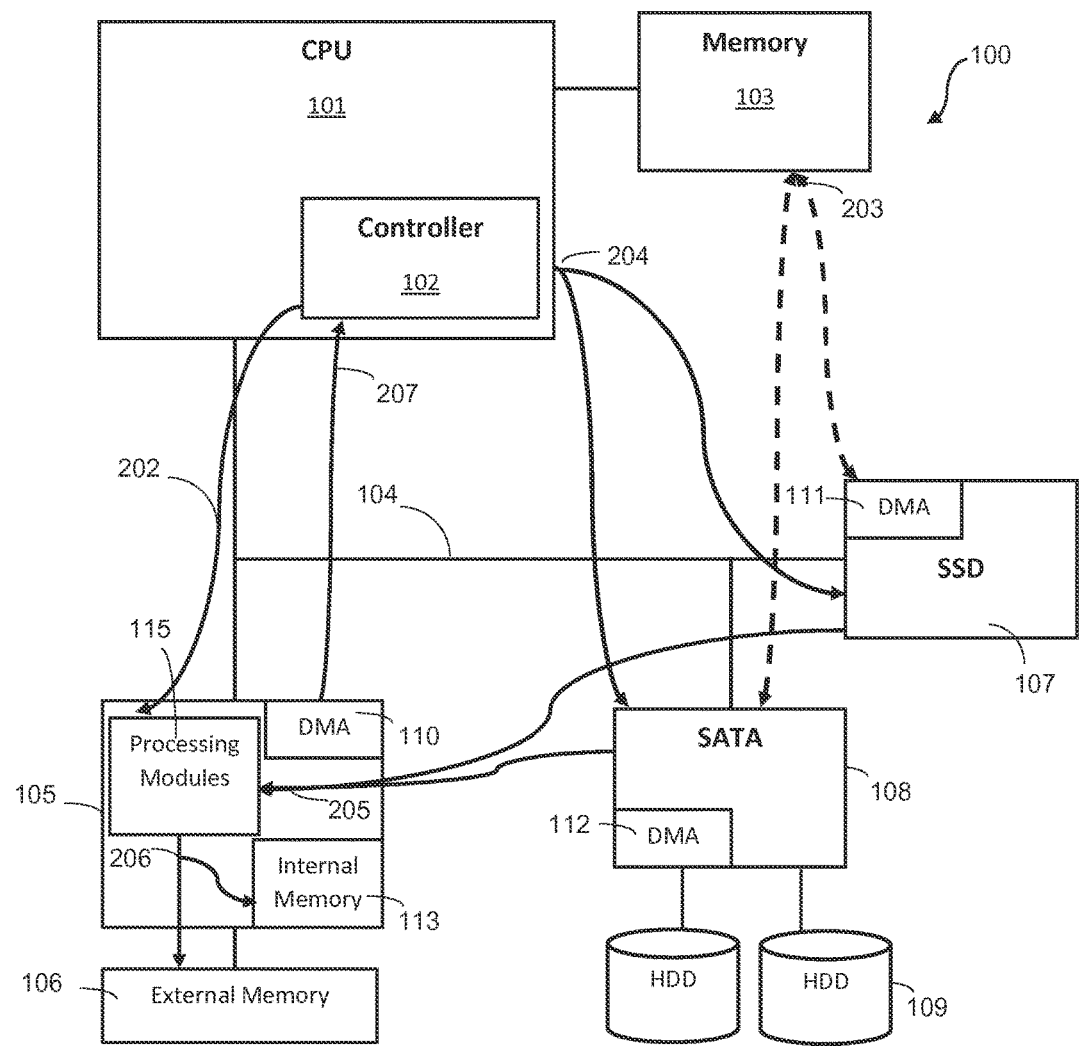
FIG. 2 is a block diagram illustrating exemplary data paths of the exemplary system depicted in FIG. 1 according to embodiments of the present invention.

With reference now to FIG. 2, an exemplary controller and associated data paths of system 100 are depicted according to embodiments of the present invention. Controller 102 orchestrates data movement among components of system 100. As depicted in FIG. 2, an exemplary database query is offloaded to the Accelerator Engine 105 for acceleration. The database query may be an SQL query, for example. An exemplary sequence of computer implemented steps performed by system 100 for offloading a computation from the CPU to the accelerator Engine are described concurrently with reference to FIG. 4.

Controller 102 interacts with an application to identify the function or functions, such as a DB query execution plan, that may be offloaded to Accelerator Engine 105 (step 401) and the name of the file or files that hold the data and potentially the location, such as a block number or an offset, for these functions (step 402). In addition, once the file names (and offsets, in some situations) are known, Controller 102 retrieves the metadata associated with the files, such as inode structure, identifies whether there are dirty pages in the page cache and constructs a scatter-gather list to program DMA engine 111 and 112 for data transfer from hard disk drive 109 to Accelerator Engine 105. A dirty page is a page that has been changed/updated in a cache page but has not been changed/updated in a secondary storage device.

With reference to Data Path 202 depicted in FIG. 2, Controller 102 prepares Accelerator Engine 105 for function execution by programming a logic of Accelerator Engine 105 using a partial or full reconfiguration (step 403), and also communicates data formats of the data to be received that are used for the function execution.

With reference to Data Path 203, when there are dirty pages in the memory of the files to be processed, Controller 102 flushes out the dirty pages to the secondary storage devices using the appropriate function call of the Operating System.

With reference to Data Path 204, when the most up-to-date version of the files are on the secondary storage device, such as hard disk drive 109, Controller 102 is operable to program DMA engines 111 and 112 that will move a copy of the files on the secondary storage nodes to the Accelerator Engine 105 (step 404). To this end, CPU 101 programs the following three sets of information into the DMA controllers:

(1) The location of the data to be moved. The location may be represented by a block number or offset on the secondary storage devices where the data is located.
(2) The address of the location the data is to be moved to on the accelerator engine. This is an address in the PCIe address space corresponding to a register or a queue, or a block of memory in the accelerator engine or External Memory 106 attached to the accelerator engine.
(3) The length of the data to be moved.

With reference to Data Path 205, when the DMA controller has been programmed with the necessary information for the data transfer and the DMA controller is ready for transfer, the DMA controller begins its operation and moves all the data that it has been instructed with to Accelerator Engine 105.

With reference to Data Path 206, the data transferred to Accelerator Engine 105 using DMA is processed by Accelerator Engine 105 (step 405). According to some embodiments, the data to be processed by Accelerator Engine 105 may first be placed in a queue, such as first-in, first-out (FIFO), and subsequently processed. The result of the computation performed on the accelerator device may be stored in Internal Memory 113 of Accelerator Engine 105 or External Memory 106 attached to Accelerator Engine 105. Internal Memory 113 and External Memory 106 may comprise block memory or EDRAM, for example. In another scenario, data may be moved to Internal Memory 113 or External Memory 106 for temporary storage and the intended computation is performed on the data at a later time. In both cases, the Internal Memory 113 and/or External Memory 106 may also be used to store intermediate results of the computation. Where a secondary storage device is local to System 120, DMA communications to and from the device may take place over PCI/PCIe or a similar protocol. Where a secondary storage device is remote to System 120, Remote DMA ("RDMA") communications to and from the storage device may take place over Ethernet or a similar protocol.

With reference to Data Path 207, once computation is completed by Accelerator Device 105, the results of the computation are moved to CPU 101 using a DMA operation performed by a DMA controller such as DMA engine 110 of Accelerator Device 105 or via a programmed I/O operation initiated by CPU 101. Depending on the application and what functionality has been offloaded to the accelerator device, the results may be post-processed or assembled/combined with other results created by the application running on CPU 101 before being presented or stored.

Figure 3:
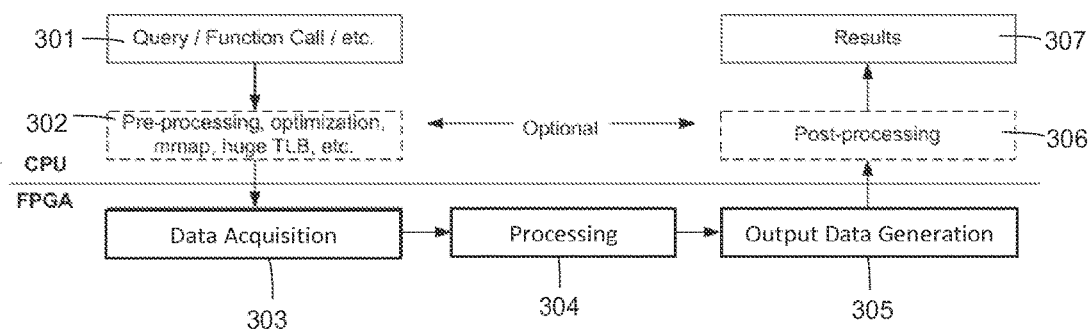
FIG. 3 is a block diagram illustrating an exemplary application acceleration function chain according to embodiments of the present invention.

With reference now to FIG. 3, an exemplary application acceleration function chain is depicted. The sequence begins at step 301, where a function call or query, such as is initiated that will be partially or fully accelerated. After the function to be accelerated has been called to the CPU, additional pre-processing, such as logical or physical plans for execution, different forms of optimization, or transformation of some data types within the function may optionally be applied to the function before the function is handed to the accelerator engine at step 302. Once the function is sent to the accelerator engine, the data to be processed is made available for processing modules 115 used for acceleration inside an accelerator engine at step 303. Once the data is available for processing modules 115, it is processed by the accelerator engine at step 304, and the output data is constructed at step 305 and moved (using direct memory access) to the CPU as a result of the function that was previously called at step 307. Before the results are returned to the function at step 307, optional post-processing functions, such as decryption may be applied at step 306.

According to some embodiments, the accelerator engine is assigned a PCI or PCIe memory address. In some embodiments, a memory address assigned to the accelerator engine appears to be an address of a memory from the perspective of an I/O subsystem or device or DMA controller.

According to some embodiments, an accelerator optimizer (not shown) is coupled to an accelerator engine. The accelerator optimizer determines which functions and/or computations to offload to the accelerator engine. The optimizer may make these determinations based on a set of factors such as present load on a CPU, the amount of memory required, the nature of the computations to be performed, or the application type that is pre-programmed into the accelerator optimizer.

Embodiments of the present invention are thus described. While the present invention has been described in particular embodiments, it should be appreciated that the present invention should not be construed as limited by such embodiments, but rather construed according to the following claims.

What is claimed is:

1. An apparatus for offloading execution of a function from a CPU to an accelerator engine, comprising:
   a CPU that determines a function to be offloaded, and locates a data related to the function, wherein the data is stored on a secondary storage device; and
   an accelerator engine prepared by a controller using at least partial reconfiguration coupled to the CPU, wherein the accelerator engine is programmed to receive the data related to the function from the secondary storage device through a direct memory access (DMA) engine, execute the function using the data related to the function received by the accelerator engine, construct output data via computing the data related to the function during the executing the function, and move the output data through the DMA engine from the accelerator engine to the CPU, wherein the CPU initiates a programmed input/output (I/O) operation to move the output data and the controller communicates data formats that are to be used for the function execution to the accelerator engine.

2. The apparatus of claim 1, further comprising a memory coupled to the accelerator engine for storing the data related to the function to be executed prior to execution by the accelerator engine.

3. The apparatus of claim 1, further comprising a memory coupled to the accelerator engine for storing an intermediate result of processing by the accelerator engine.

4. The apparatus of claim 1, further comprising a second direct memory access engine coupled to the secondary storage device, wherein the first direct memory access engine and the second direct memory access engine coordinate a data transfer between the secondary storage device and the accelerator engine.

5. The apparatus of claim 4, wherein the CPU is further configured to remove dirty pages from the secondary storage device.

6. The apparatus of claim 4, wherein the first direct memory access engine and the second direct memory access engine are programmed based on at least one of a location on the secondary storage device of the data to be moved, an address of a location the data is to be moved to on the accelerator engine, and a length of the data to be moved.

7. The apparatus of claim 6, wherein the first and second DMA controllers communicate over PCI.

8. The apparatus of claim 6, wherein the first and second DMA controllers communicate over Ethernet.

9. A method of offloading execution of a function of an application from a CPU to an accelerator engine coupled to the CPU, comprising:
    determining, by the CPU, a function to be offloaded from a CPU to an accelerator engine, and the application is running in the CPU;
    locating, by the CPU, a data related to the function, wherein the data is stored on a secondary storage device external to the CPU;
    receiving, by the accelerator engine through a direct memory access (DMA) engine, the data related to the function from the secondary storage device directly to the accelerator engine wherein the accelerator engine is prepared by a controller using at least partial reconfiguration;
    executing, by the accelerator engine, the function using the data related to the function received by the accelerator engine;
    construct output data via computing the data related to the function during the executing the function; and
    moving, by the accelerator engine, the output data as a result of the function through the DMA engine to the CPU using a programmed input/output (I/O) operation initiated by the CPU.

10. The method of claim 9, further comprising programming a logic of the accelerator engine based on the function to be offloaded, wherein the processing the data by the accelerator engine uses the logic of the accelerator engine.

11. The method of claim 9, further comprising post-processing a first output of the accelerator engine or assembling a second output of the accelerator engine with other results created by an application program running on the CPU.

12. The method of claim 9, wherein locating data comprises determining a block number of the data within the file.

13. The method of claim 9, wherein locating data comprises determining an offset of the data within the file.

14. The method of claim 9, further comprising retrieving metadata associated with the file.

15. The method of claim 9, further comprising:
    identifying a second file that has been updated in a cache and not updated in the secondary storage device; and
    updating the second file in the secondary storage device to match the file in the cache.

16. The method of claim 9, wherein programming a logic of the accelerator engine comprises communicating a data format used for function execution.

17. The method of claim 9, wherein programming a DMA engine comprises programming a location of the data to be moved, an address of a location the data is to be moved to on the accelerator engine, and a length of the data to be moved.

18. The method of claim 9, further comprising transferring the data to a queue prior to processing.

19. A non-transitory computer readable storage medium having computer-executable instructions for performing a method of offloading execution of a function of an application from a CPU to an accelerator engine, the method comprising:
    determining a function of an application program to be offloaded from a CPU to an accelerator engine, wherein the application is running in the CPU;
    locating data related to the function, wherein the data is stored on a secondary storage device external to the CPU;
    programming a direct memory access (DMA) engine to transfer the data related to the function from the secondary storage device to the accelerator engine;
    executing the function using the data received by the accelerator engine, wherein the accelerator engine is prepared by a controller using at least partial reconfiguration;
    construct output data via computing the data related to the function during the executing the function; and
    moving the output data as a result of the function through the DMA engine from the accelerator engine to the CPU, wherein the CPU initiates the move of the output data using a programmed input/output (I/O) operation.

20. The non-transitory computer-readable storage medium of claim 19, wherein locating data comprises determining a block number of the data within the file.

21. The non-transitory computer-readable storage medium of claim 19, wherein locating data comprises determining an offset of the data within the file.

22. The non-transitory computer-readable storage medium of claim 19, further comprising retrieving metadata of the file.

23. The non-transitory computer-readable storage medium of claim 19, further comprising identifying a second file that has been updated in a cache and not updated in a secondary storage device and updating the second file in the secondary storage device to match the file in the cache.

24. The non-transitory computer-readable storage medium of claim 19, wherein programming a logic of the accelerator engine comprises communicating a data format used for function execution.

25. The non-transitory computer-readable storage medium of claim 19, wherein programming a DMA engine comprises programming a location of the data to be moved, an address of a location the data is to be moved to on the accelerator engine, and a length of the data to be moved.

26. The non-transitory computer-readable storage medium of claim 19, further comprising transferring the data to a queue prior to processing.

27. The non-transitory computer-readable storage medium of claim 19, further comprising assembling a first output of the accelerator engine with a second output created by a second application program running on the CPU.

* * * * *